United States Patent [19]

Kawashima et al.

[11] 3,879,056
[45] Apr. 22, 1975

[54] SAFETY GAS BAG STRUCTURE

[75] Inventors: Takayoshi Kawashima; Akio Tange; Seiichi Yamamoto, all of Nagoya; Takashi Baba; Yutaka Kondo, both of Toyota; Choji Nozaki, Nagoya; Toshihiko Sakai, Kasugai, all of Japan

[73] Assignees: Toyoda Boshoku Kabushiki Kaisha, Kariya-shi; Toyota Jidosha Kogyo Kabushiki Kaisha, Toyota-shi; Kabushiki Kaisha Toyota Chuo Kenkyusho, Nagoya-shi, all of Japan

[22] Filed: Feb. 21, 1973

[21] Appl. No.: 334,407

[30] Foreign Application Priority Data
Feb. 21, 1972 Japan.............................. 47-18256
Feb. 29, 1972 Japan.............................. 47-20798

[52] U.S. Cl............................................. 280/150 AB
[51] Int. Cl............................................. B60r 21/08
[58] Field of Search............ 280/150 AB; 188/1 C; 244/138 R; 293/71 R, 71 P; 244/151 R

[56] References Cited
UNITED STATES PATENTS

| | | | |
|---|---|---|---|
| 2,452,783 | 11/1948 | Nebesar | 244/138 R |
| 2,974,912 | 3/1961 | Namsick | 244/138 R |
| 3,302,973 | 2/1967 | Ravau | 244/151 R X |
| 3,476,402 | 11/1969 | Wilfert | 280/150 AB |
| 3,586,347 | 6/1971 | Carey et al. | 280/150 AB |
| 3,591,201 | 7/1971 | Brawn et al. | 280/150 AB |
| 3,614,127 | 10/1971 | Glance | 280/150 AB |
| 3,656,791 | 4/1972 | Truesdell | 280/150 AB |
| 3,761,111 | 9/1973 | Kemper | 280/150 AB |

*Primary Examiner*—Kenneth H. Betts
*Attorney, Agent, or Firm*—Hill, Gross, Simpson, Van Santen, Steadman, Chiara & Simpson

[57] ABSTRACT

A gas bag of high safety, responsibility and stability for attachment to a high speed moving vehicle, comprising a hollow bag body, a gas introducing hole means, and at least one restraining member provided in the hollow bag body for restraining the free deformation of said hollow bag body upon the pressing of the occupant thereagainst in the inflated condition, said restraining member having at least one breaking part which is broken when a predetermined tensile force is applied to the restraining member, whereby, when the occupant presses said inflated bag body in the sudden stop of the moving apparatus, at least one breaking part is broken and a rebounding force of the bag body against the occupant can be remarkably reduced.

30 Claims, 15 Drawing Figures

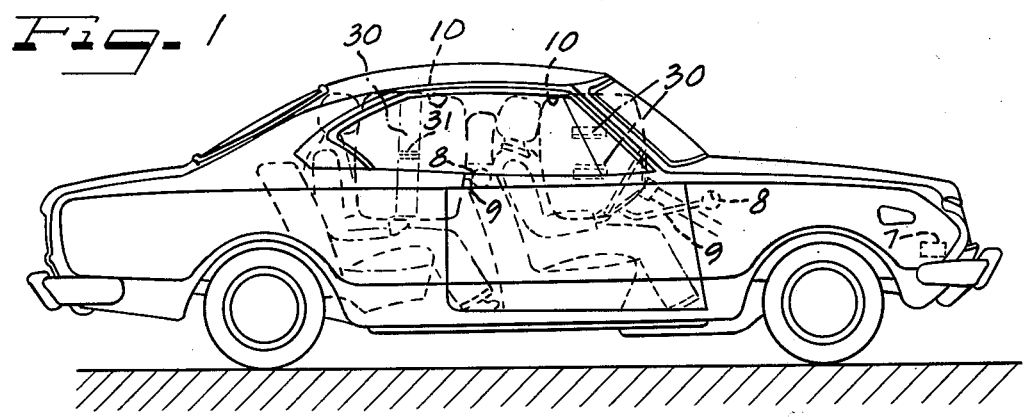
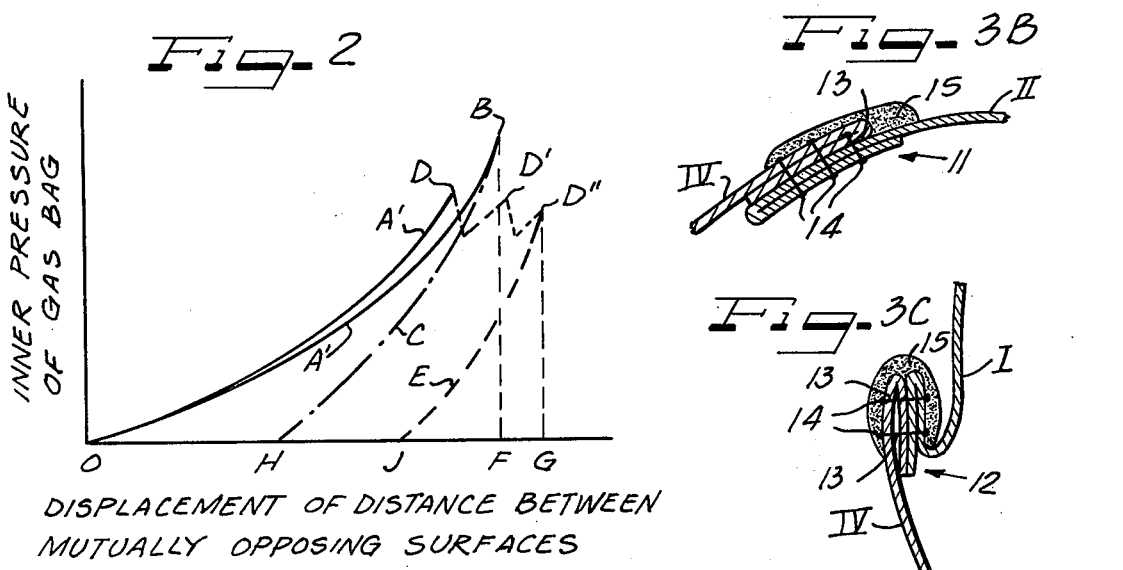
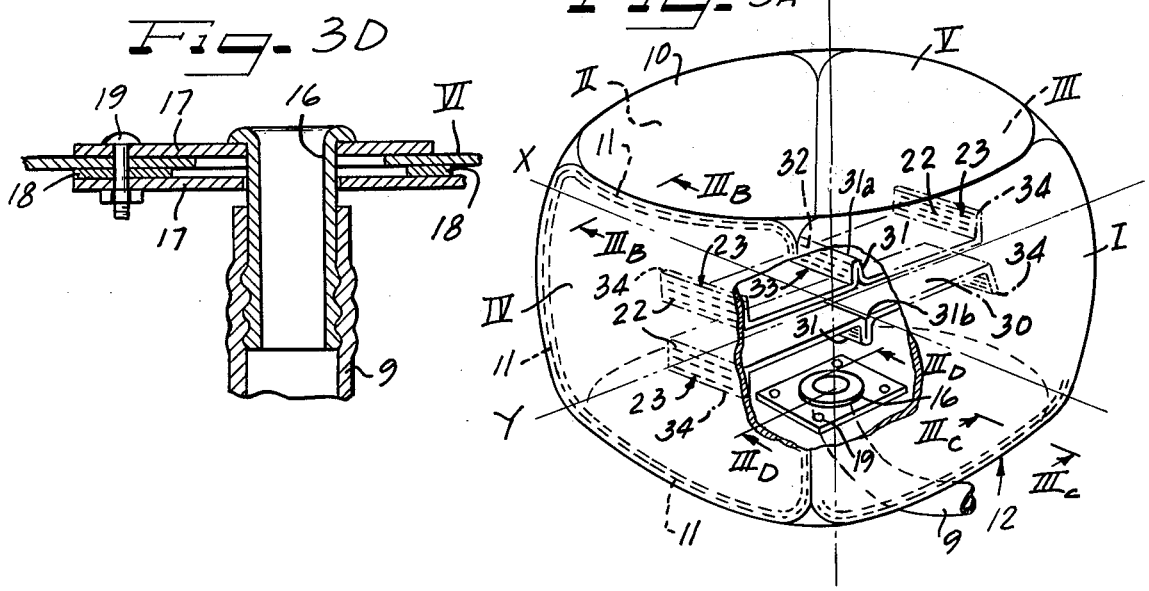

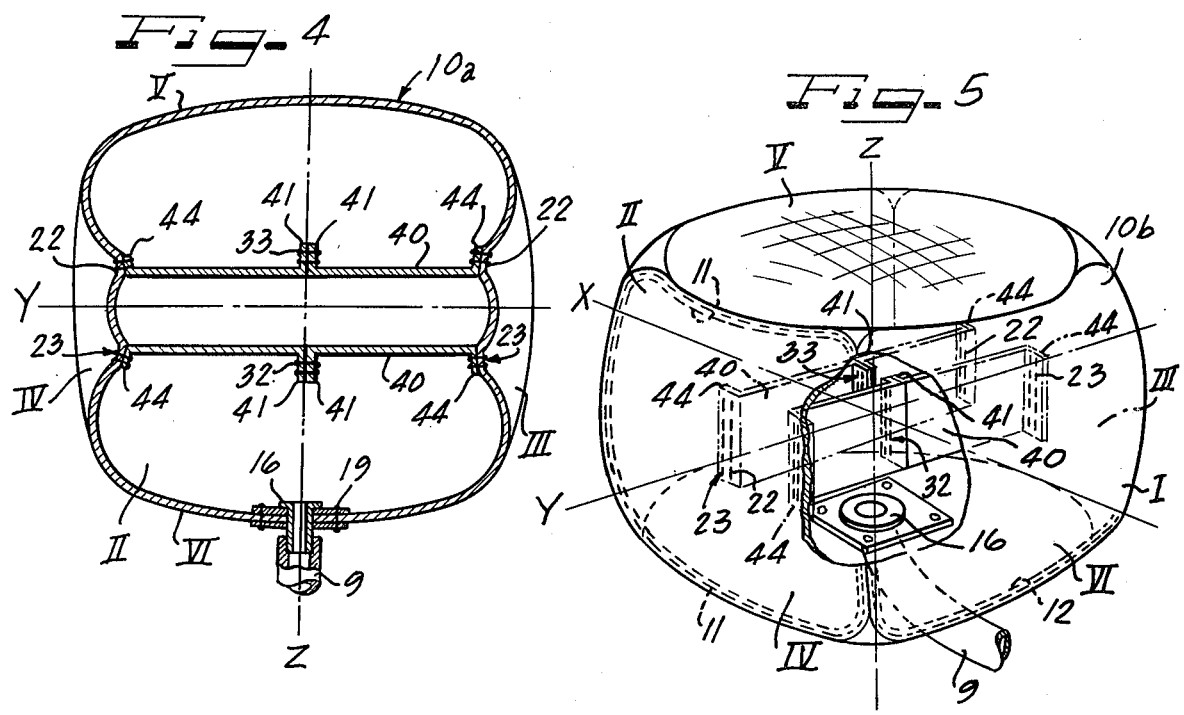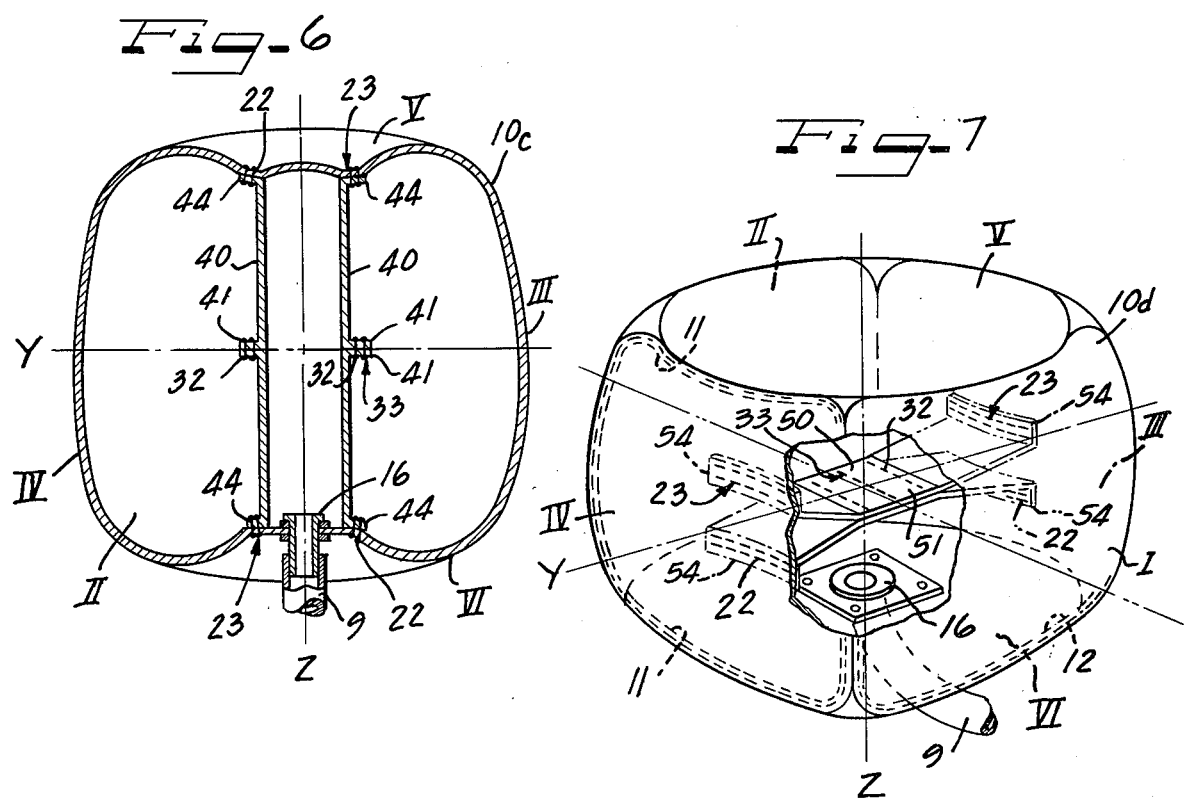

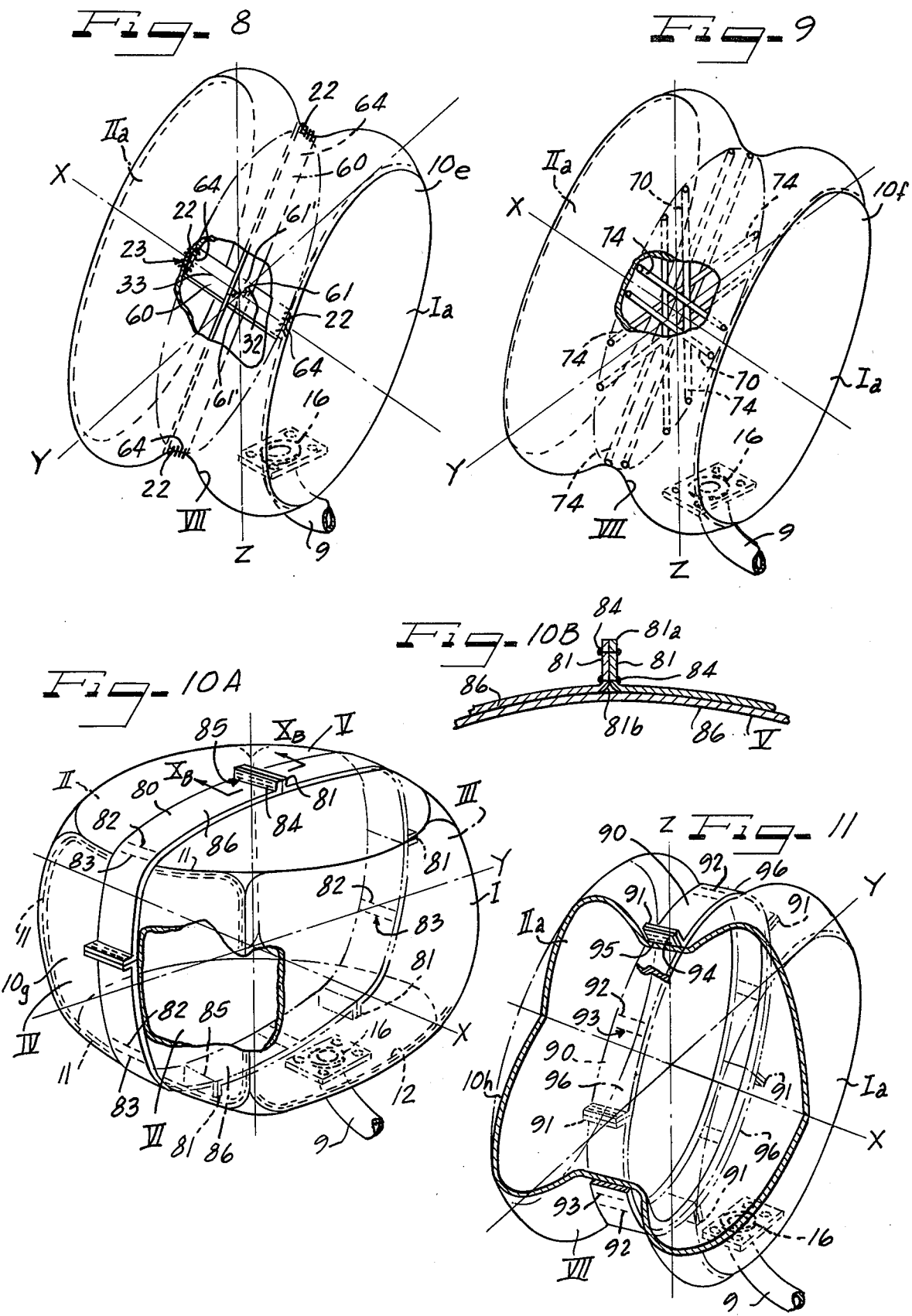

SAFETY GAS BAG STRUCTURE

The present invention relates to a gas bag device, and especially to the improvement of the construction of the gas bag itself.

In case of a sudden stop at such time as a collision of automobiles and the like occurs, it is feared that the occupants will collide against a steering wheel or a dash board, or against the back part of the front seat, and that their heads, breasts, and the like, may be hurt. A gas bag system has been known and employed for preventing such injuries as described above.

In the conventional gas bag device, a bag body was formed of a sheet of filament textile, plastic, and the like, having substantially no air permeability and elasticity, and its inner part was made to be hollow so that high pressure gas could be injected thereinto. Such gas bag (or in other terms, it may be called an air bag) was, in the usual case, folded without the high pressure gas therein and housed in a steering wheel portion, a dash board or the back part of the front seat of an automobile or the like in the deflated condition. The hollow inner part of the gas bag was connected with a high pressure gas container mounted on the automobile, through a high pressure gas supplying path. Just before or at the time of the sudden stop of the automobile or the like, a detector attached to the automobile body was operated, and the high pressure gas in the gas container was rapidly supplied into the gas bag by opening a valve hole of the high pressure gas container so that the gas bag was rapidly inflated in front of the occupant. Thus, he was prevented from being thrown forwardly and the bodies of the occupants were protected. In this case, the maximum acceleration of the motion of thhe occupant was limited within the permitted limit, for example, not more than 60G (G is gravity acceleration), and he is prevented from being hurt.

However, this kind of conventional gas bag device has defects. Namely, in case of sudden stop or collision of the automobile and the like, the gas bag system is started to inflate the bag body. An occupant touching the inflated gas bag under the influence of inertial forces presses the gas bag in the pressing direction of the occupant to deform the gas bag. The pressure of the high pressure gas in the deformed gas bag is thus increased, and when the inner pressure of this gas bag reaches the maximum pressure, the relative speed of the occupant comes to zero. The pressure and energy stored in the bag body is then changed to a rebounding force by the gas bag. The danger is than that the occupant is rebounded by this rebounding force and may be thrown against various structures in the automobile and may be hurt. Therefore, it is one of the important problems to be resolved to prevent the occupant from being spring back by the rebounding force of the gas bag.

According to the present invention, the said problem is resolved by improving the construction of the gas bag itself which is employed for the gas bag system. Namely, the novel gas bag of the present invention has characteristics as follows: A hollow bag body is formed of sheet material having substantially no air permeability or elasticity. This hollow bag body inflates with the high pressure gas supplied from high pressure gas supplying source upon a sudden stop of the automobile. (Hereafter this condition will be called the "free inflated condition"). A restraining member of substantially no elasticity is constructed in said hollow bag body for restraining the free deformation of said hollow bag body in the inflated condition upon the pressing of the occupant of the automobile and the like thereagainst. At least one breaking part is provided at least one portion of the said restraining member so that when a tensile force larger than the predetermined value is applied, the said braking part is broken.

In case the gas bag of the present invention is provided in an automobile and the like, it is necessary to adjust the direction of said axis along which said restraining member is constructed so as to be perpendicular to the pressing direction of the occupant to the bag body, when the sudden stop of the automobile and the like occurs and when the high pressure gas is introduced into the hollow bag body. Then, a remarkable operating effect is obtained by utilizing the energy absorbing effect which occurs at the time when the restraining member constructed in the gas bag of the present invention is broken. The said effect could not be obtained where the convention gas bag was employed. Thus, the said problem is solved, namely the occupant is prevented from being sprung back by a rebounding force of the gas bag.

Namely, if the gas bag of the present invention is provided such that the applying direction of the force applied to the exterior of said gas bag in the free inflated condition (that is, the pressing direction of the occupant to the bag body), is made to be perpendicular to the longitudinal direction of the restraining member, then in case of the sudden stop of the automobile and the like, the pressure of the high pressure gas in the bag body is gradually increased as the gas bag is deformed by being pressed by the occupant under the influence of the inertial forces. But at this time, the free deformation of the bag body (that is, the free enlargement of the volume of the bag body) due to the increase of the inner pressure thereof is restrained by means of the restraining member. As the result, the tensile force operating in the longitudinal direction of the restraining member is increased.

When the inner pressure of the gas bag reaches a predetermined value, (in other words, when the moving speed in the pressing direction of the body of the occupant is lowered, and the pressure in the bag body and energy stored as the tensile force of the bag body is increased, and the tensile force applied to the restraining member then reaches the predetermined value), the breaking part of the restraining member is caused to be broken. As a result, the restraining of the bag body by the restraining member is released somewhat, so that the inner pressure is lowered because of the sudden permitted enlargement of the volume of the bag body. Thus, the rebounding force of the bag body can be effectively absorbed. As a result, the rebound of the occupant can be remarkably decreased compared with the case of the conventional gas bag in which the restraining member is not provided. Therefore, the gas bag of the present invention is advantageous in that the occupant can be prevented from being hurt by the collision against various structures within the automobile due to the rebound of the occupant.

In this connection, we have carried out experiments with both the gas bag of the present invention (the gas bag of the first embodiment which will be described hereafter), and the conventional gas bag (a gas bag the same as that of the first embodiment except that the restraining member is not provided). According to the result of the experiments, the rebounding energy of the gas bag of the present invention can be decreased to about one third of that of the conventional gas bag (the coefficient of the rebound of the conventinal gas bag is 0.91 but that of the gas bag of the present invention is 0.50). The conventional gas bag is compared with the gas bag of the present invention in FIG. 2 by taking the inner pressure of each gas bag for the ordinate and the displacement of the distance between the manually opposing surfaces (the distance between the front panel and the back panel) in the direction of the deformation of the bag body caused by the gas bag for the abscissa. When the conventional gas bag is deformed, pressed by the occupant. The pressure of the high presure gas in the bag body increased along the curve A as the bag body is deformed, and after the decrement of the distance of the mutually opposing wall surfaces in the pressing direction of the occupant to the hollow bag body comes to the minimum at the point B, the same distance begins to increase by means of energy of the inner pressure of the gas bag, and at the same time, gas pressure in the bag body is converted to kinetic energy by which the occupant is rebounded on the hollow bag body and then the inner pressure of the gas body is lowered along the curve C. In other words, in case of the conventional gas bag, the energy of both of the inner pressure and the tensile force of the bag body is shown with the area OABFO, and the energy corresponding to the area BCHF is converted to the kinetic energy by which the occupant is sprung in the reverse direction against the pressing direction of the occupant to the hollow bag body.

On the contrary, in the case where the gas bag of the present invention is deformed (pressed by the occupant), the pressure of the high pressure in the bag body is increased along the curve A' as the bag body is deformed. The increment of this inner pressure operates as the increment of the tensile force which stretches the restraining member in the longitudinal direction thereof. Some part of the breaking or breakable part of the restraining member (for example, a first row of stitches) is designed to be broken when the inner pressure of the gas bag reaches the point D. By the partial break of the said breaking part, the kinetic energy tending to rebound the occupant in the reverse direction (against the pressing direction) of the occupannt to the hollow bag body can be absorbed, and at the same time, the inner pressure of the gas bag is made to be lowered. But the said inner pressure is again increased upon the successive deformation of the gas bag in the pressing direction of the occupant. And at the time when the gas pressure in thhe gas bag reaches the predetermined point D', some part of the rest of the breaking part of the restraining member (or second row of stitches, for example) is broken, the kinetic energy by which the occupant is rebounded in the reverse direction is again reduced, and also the inner pressure of the gas bag is lowered. Moreover, as the gas bag is deformed further by the displacement of the occupant, the inner pressure of the gas bag is increased again the same as the case described before. When it reaches the predetermined gas pressure shown with the point D'' (when the displacement of the occupant in the pressing direction becomes zero), all the rest of the breaking part of the restraining member is broken, and as a result, the inner pressure of the gas bag is lowered along the curve E. Thus, in case of the gas bag of the present invention, only the pressure shown with the area D''EJG of the area OA'DD'D''GO, is applied to the occupant as kinetic energy.

It is apparent from the comparison of this area D''DJG, with the corresponding area BCHF in case of the said conventional gas bag that the rebounding energy of the gas bag by which the occupant is rebounded backward of the seat is remarkably reduced with the gas bag of the present invention compared to conventional gas bags.

Furthermore, the volume of the gas bag of the present invention can be made to be smaller than that of the conventional gas bag because of the restraint by the restraining member. Therefore, the inflating period of the high pressure gas can be made shorter compared with the case of the conventional gas bag, and also, the volume of the gas cylinder supplying the high pressure gas can be made to be small. This type of gas bag device can be put to practical use in such fields as automobiles where the light weight and high speed device of this safety device operates rapidly and certainly in an emergency situation.

Accordingly, it is an object of the present invention to provide a novel and useful gas bag for vehicle occupant protection.

Another object of the present invention is to provide a gas bag having high safety, responsibility and stability.

Another object of the present invention is to provide a gas bag wherein at least one deformation restraining member is provided so that a breakable part thereof is broken due to the impact therein by the occupant, for reducing a rebounding force of a bag body against the occupant in the sudden stop of a moving vehicle.

Another object of the present invention is to provide a gas bag of simple and compact construction for practical use.

DESCRIPTION OF THE DRAWINGS

The embodiments of the present invention will be explained with the annexed drawings. The embodiments will be mainly explained relative to the improvement of the construction of the gas itself rather than the conventional gas bag system. The devices except the said gas bag itself, such as the source for supplying the high pressure gas into the gas bag, the shock detector including the command transmitting system for initiating inflation of the gas bag by means of packing or inserting the high pressure gas supplied from the high pressure gas supplying source into the gas bag through a supply path are constructed in accordance with known techniques.

FIG. 1 is a side-elevational view of an automobile incorporating the invention;

FIG. 2 is an explanatory graph;

FIG. 3A is a generally isometric view of an air bag including one embodiment of the invention;

FIG. 3B is a sectional view of a seam of the air bag taken along line IIIB-IIIB of FIG. 3A;

FIG. 3C is a sectional view of another seam of the air bag taken along line IIIC—IIIC of FIG. 3A;

FIG. 3D is a sectional view of the gas connection taken along line IIID—IIID of FIG. 3A;

FIG. 4 is a cross-sectional view of an air bag incorporating a second embodiment of the invention;

FIGS. 5, 7, 8, 9, 10A and 11 all comprise isometric views of additional embodiments of the invention;

FIG. 6 is a cross-sectional view of an air bag incorporating still another embodiment of the invention; and FIG. 10B is a cross-sectional view taken along line XB—XB of FIG. 10A.

The construction of the gas bag is explained in the free inflated condition in order that persons skilled in the art will be able to understand easily the present invention. Thus, the gas bag shown in the figures is not in the condition of being deflated and housed, but is in the nearly-inflated condition in which the bodies of the occupants have not yet touched and pressed the gas bag.

For convenience, the respective axes passing through the nearly central part of the hollow inner part and the respective sealed wall surfaces in the free inflated condition of the gas bag will be termed as follows:

X axis:
   an axis line passing through the central part of the hollow inner part of the gas bag (the gas bag is mounted on the vehicle so that this X axis line is nearly parallel to the moving direction of the occupannt to the bag body when the occupant touches and presses the bag body toward the moving direction under the influence of inertial force.

Z axis:
   the axis line passing generally vertically through the central part of the hollow inner part of the gas bag crossing perpendicularly the said X axis.

Y axis:
   the axes line passing through the central part of the hollow inner part of the gas bag and crossing perpendicularly the respective axis lines of the said X axis and Z axis.

front panel I:
   the front wall surface of the gas bag generally perpencicular to the direction of X axis, and in the front side relative to the moving direction of the vehicle.

back panel II:
   the rear wall surface opposite the front panel I in nearly parallel relation thereto (namely, it is contacted directly by the bodies of the occupants).

left side panel III:
   the side wall surface generally parallel to the direction of Z axis, and in the left side of the moving direction of the vehicle.

right side panel IV:
   The side wall surface opposite the left side panel and generally parallel thereto.

top panel V:
   the generally horizontal wall surface generally parallel to the X axis and in the upper side relative to the moving direction of the vehicle.

bottom panel VI:
   the bottom wall surface opposite the upper side panel and nearly parallel relative thereto.

The first embodiment of the present invention will be explained with regard to FIG. 1, and FIG. 3A to FIG. 3D. The respective panels 1 to VI of the gas bag 10 of the first embodiment are made of nylon filament woven fabrics of substantially no air permeability and elasticity the same as the material employed for a conventional gas bag. The tensile strength of the fabrics is about 30 kg/cm both in the wrap and weft directions. Nylon yarns 210 denier made of 24 filaments may be used both for wraps and wefts. The number of ends and picks per inch is both 58. The front panel I, the back panel II, the top panel V and the bottom panel VI are formed by bending a piece of said fabrics and sewing both edge ends 12 thereof in its longitudinal direction together as shown in FIG. 3C. And the peripheral edge ends 11 of left side panel III and the right side panel IV are sewed together with those of said piece of fabrics forming panels I, II, V and VI as shown in FIG. 3B.

As shown in FIGS. 3B and 3C, the seam is made of rows of lock stiches 14 (8 stitches per inch) formed by nylon 8s count thread for joining fabrics II and IV or I and VI in parallel to the edge 11 or 12. A filler treatment is applied on the respective seams of the outer wall surface of the said hollow bag body, comprising a coating material 15 such as chloro-sulfonation polyethylene, so that the inner part of the hollow bag body of the gas bag 10 may be in an air tight condition. Also, as shown in FIG. 3D, the high pressure gas-introducing tube 16 is fixed to the bottom panel VI of the gas bag 10 through the bracket 17 and the sealing member 18 with fixing members such as bolts and nuts 19 to provide an air-tight connection to a high pressure gas container 8 via the high pressure gas supplying path 9. The structure described above is equal to that of a conventional gas bag. The feature of the present invention exists in the structure that at least one restraining member is constructed in the hollow bag body of the gas bag. The said feature will be explained hereafter.

In case of the first embodiment of the present invention, as shown in FIG. 3A, one pair of strip restraining members 30 of substantially no elasticity are constructed along Y axis in the inner hollow part of the gas bag 10 connecting the right side panel IV and the left side panel III. The restraining members 30 are formed of the same fabrics as those of the said gas bag 10. And their tensile strength, size of width and number constructed in the bag body are designed and produced so that the breakable parts of the restraining member are broken when a tensile force larger than the predetermined value of breaking limit is applied to said members. The said breaking limit of the restraining members is the product value of the said predetermined inner pressure (about 0.4 ~ 0.5kg/cm²) of the gas bag 10 changed along X axis, and the area of the left side panel III or that of the right side panel IV. The length of the restraining member is made to be a little shorter then the length of one side of the panel of said bag body.

Namely, the surface of the restraining members 30 in the transverse direction thereof is made to be nearly parallel to the surface of the top panel V and that of the bottom panel VI. The bent end parts 34, which are formed by bending the both ends of the restraining members 30 at a right angle, and the inner wall surfaces of the nearly central part of said left side panel III and the right side panel IV are sewed together in one body with nylon thread 22 to form the double parallel rows of stitches 23. The filler treatment is performed to the edge part of the restraining member where the stitches 23 are exposed at the outer wall surface of the bag body, with the coating material 15, so that the hollow bag body of the gas bag 10 is in air tight condition. Folded parts 31 are formed in the nearly central part of the restraining members 30 in the longitudinal direction thereof as breaking parts which are broken when a force larger than the predetermined value is applied to the restraining members 30 in their longitudinal direction.

Now, the folded parts 31 will be explained in detail with FIG. 3A. The folded parts 31 are formed as follows; namely, the strip of fabric is once folded near the central part of the longitudinal direction thereof and stitched together in the adjacent projected parts with the thread 32 to form the plural rows of stitches 33 in the transverse direction thereof from the top part 31a to the bottom part 31b. The tensile strength of the sewing thread 32 employed in the folded parts 31 is weaker than that of the sewing thread 22 employed for joining the cloth of the restraining members together with the respective left and right side panels III, IV at the bent end parts 34. Also, the said folded parts 31 are designed and sewed so that the sewing threads 32 of the rows of stitches formed in the projected direction of the folded parts 31 are cut in order from near the bottom part 31b to the top part 31a, when a tensile force larger than the predetermined value is applied to the restraining members 30.

The gas bag 10 having the construction described above is mounted in a high speed moving apparatus such as an automobile and the like in the folded condition such that the X axis nearly coincides with the moving direction of said apparatus. In case of a sudden stop of the vehicle, a shock detector 7 is operated and the high pressure gas is introduced into the bag body from a high pressure gas container 8 through the gas introducing tube 16, and then the gas bag 10 approaches the free inflated condition. When the bodies of the occupants are thrown toward the moving direction of the vehicle under the influence of inertial force the bodies of the occupants touch and press the back panel II of the gas bag 10. At this time, the front panel 1 of the gas bag 10 touches with a portion of the vehicle such as the dashboard. Then the gas bag 10 cannot move in the moving direction of the vehicle and the distance between the front panel I and the back panel II decreases as the gas bag 10 is pressed in the direction of X axis by the occupant so that the bag body is forced to be deformed, and then the gas pressure of its inner part is made to increase.

In the hollow bag body of the gas bag 10 of the first embodiment, the restraining members 30 are constructed to connect the left side panel III and the right side panel IV, so the said deformation of the gas bag and the increasing of the gas pressure increases the force stretching the restraining members 30 in their longitudinal direction.

In the case of the restraining members 30 of the first embodiment, the folded parts 31 are formed at nearly the central part of the longitudinal direction. As the weakest parts of the restraining members 30 exceeds the predetermined value of breaking limit, the folded parts 31 are broken and stretched to become plane parts (in case of the present invention, this kind of a change in the folded parts of the restraining members is included in the term breaking). The sewing thread of rows of stitches formed in the folded parts 31 is gradually broken in order from near the bottom part 31b of the projected edge toward the top part 31a, and from the front panel I side to the back panel II side in the transverse direction of the restraining members.

When the restraining members 30 are broken in order at the folded parts 31 as described above, the necessary energy for the breaking is consumed, and at the same time, the restraining between the left side panel III and the right side panel IV is released by the breaking of the restraining members 30, and also the volume of the bag body is enlarged. Thus, the rebounding force of the gas bag is absorbed. Therefore, the energy based on the rebounding force of the gas bag which tends to rebound the occupants in the reverse or rearward direction relative to the moving direction of the vehicle is made to be very small and the bodies of the occupants are prevented from being thrown backwardly against structures in the vehicle.

Moreover, with respect to the gas bag 10 of this embodiment, the volume of the said gas bag is formed to be smaller than the conventional gas bag because the bag is restrained by the restraining member so when the high pressure gas is inserted, the bag body can be inflated by the smaller amount of the high pressure gas compared with the case of the conventional gas bag. Also, the period required for packing or inserting the high pressure gas will be effectively shortened.

Said first embodiment has been explained according to an example wherein the folded part 31 is provided at only one portion in one restraining member. If plural folded parts are provided in one restraining member in its longitudinal direction so as to break in order when the tensile force is applied thereto the energy may be gradually absorbed, still more. Also, with respect to said first embodiment, the folded part is formed by only one turn or bend of the folding operation. If the folded part is formed by folding the fabric several times, the folded part can be gradually broken in order. In case of the first embodiment shown in FIG. 3A, the surfaces of the restraining members 30 in their transverse direction of the width of the restraining members 30 are provided nearly parallel to X axis is shown, but one may also provide the said members such that the surface in their transverse direction are made to be nearly perpendicular to the X axis. In case of the gas bag provided in the latter manner, the breaking of the folded parts 31 is carried out instantly and certainly, when the tensile force becomes larger than the value determined before. Namely, if the occupants strike against the back panel II of the bag body, the tensile force is uniformly applied to the row of stitches near the bottom part 31b of the projected edge so that the sewing thread thereof is cut at about the same time. Then the tensile force is applied to the sewing thread of the next row of stitches adjacent to the row of stitches cut first which sewing thread is cut at the same time in the same manner as the case described above. Thus, the respective sewing threads are cut in order from that forming the row of stitches near the bottom part 31b of rhe projected edge of the folded part 31 to that forming the row of stitches near the top part 31a, and then the whole of the folded part 31 of the restraining members 30 is made to be broken. So, compared with the case of the said first embodiment, when the predetermined tensile force is applied, the breaking of the folded part is carried out certainly, rapidly and instantly. It also has the merit that the folded part as the breaking part can be made more easily in accordance with the design value of the tensile force.

The second embodiment, shown in FIG. 4, is constructed as follows: One pair of the restraining members 40, made of the same material as that of the first embodiment, are constructd connecting the left side panel III and the right side panel IV of the gas bag 10a along the Y axis in the condition that their surfaces in the transverse direction are nearly parallel to the X axis. Their length in the said constructed condition is formed to be shorter then the distance between the left side panel III and the right side panel IV. the second embodiment is different from the first embodiment in the following points; namely, the facing end parts 41 are formed at the nearly central portion in the longitudinal direction of the restraining members 40 so that they are broken when the tensile force larger than the predetermined value is applied in the longitudinal direction of the restraining members 40. The other structure, such as the connected condition between the both end parts 44 of the restraining members and the respective left side panel III and the right side panel IV is the same as the first embodiment.

The facing end parts 41 of the restraining members 40 of the second embodiment, which is a feature of the construction of the said second embodiment, are formed as follows: At a nearly central portion in the longitudinal direction, the strip of woven fabric is split to form the bent or folded end part 41 at about a right angle relative to the said longitudinal direction, and as shown in FIG. 4, the ben end parts are sewed together in one body so that the plural rows of stitches are formed parallel to one another in the transverse direction of the strip to the bent direction. The tensile force of the sewing thread 32 employed for the facing end part 41 is less than that of the sewing thread 22 employed for connecting the both end parts of the restraining members and the panels. Also, the facing end parts 41 are made so that when a tensile force larger than the predetermined value is applied to the restraining members 40, the sewing threads 32 are cut in order from that forming the row of stitches near the folded root of the facing end part 41 toward that forming the row stitches near the top end thereof and also, they are cut in the transverse direction of the restraining members 40 from the front panel I side back to the back panel II side.

In case of the second embodiment, when the tensile force applied to the restraining members 40 is increased to the predetermined value, the sewing thread 32 of the facing end parts 41, formed as the weakest part of the restraining members 40 is cut, and then, the parts forming the facing end parts 41 are entirely split and separated each other. In the present invention, this kind of change of the facing end parts of the restraining members is, as described above, also called a breaking).

As in the case of the first embodiment described before, the sewing thread 32 is cut in order from the row of stitches near the root of the facing end parts toward the row of stitches near the top end part thereof also, and in the transverse direction of the restraining members 40 from the front panel I side to the backpanel II side. However, unlike the case of the first embodiment, the restraining members 40 are entirely separated into two pieces of strips in the longitudinal direction by the breaking of the restraining members 40 at the facing end parts. Therefore, the steady and stabilized energy absorbing effect can be obtained.

Moreover, in case of the said embodiment, the restraining members 40 are constructed so that the surface in the transverse direction of the said restraining members 40 is made to be parallel to the X axis. Also, the restraining members 40 such as those of the second embodiment can be also constructed connecting the left side panel III and thr right side panel IV in the condition that the surface in the transverse direction of the restraining members 40 is nearly perpendicular relative to the X axis.

In case of the third embodiment having above described construction the gas bag 10b is deformed with the outer force in the direction of X axis by the occupant touching against the gas bag, and the tensile force is applied to the restraining members 40. When this tensile force comes to be larger than the predetermined value, the sewing thread 32 connecting the facing end parts 41 of the restraining members 40 is cut off at one time, and the facing end parts 41 of the restraining members 40 are instantly broken, so the value of the tensile force for the breaking can be set certainly before-hand compared with the case of the said second embodiment.

As the predetermined tensile force is uniformly applied to the facing end parts 41, the whole length of the sewing thread of the row stitches in the nearest situation of the root of the part 41 is cut off at about one time. Then, the tensile force is applied to the next row of stitches which is parallel and adjacent to the row of stitches described before, and the sewing thread forming the next row of stitches is cut off at one time.

Also, in the case of the gas bag 10b of the said third embodiment, the energy of about 100 kg.m can be absorbed by breaking parts of the restraining members so the energy absorbing effect is much better than that of the other embodiments. At this occasion, the maximum deceleration against the occupant was about 23G, and its continuous period was about 20m sec. and these values are negligibly small compared with anti-stock characteristics of the human beings, and, therefore, the gas bag of this embodiment can be used with advantage.

In cases of the second and third embodiments, the restraining members were constructed connecting the hhe left and the right side panels III, IV. Besides, as the case of the gas bag 10c of the fourth embodiment shown in FIG. 6, the restraining members 40 equal to those of the second embodiment can be also constructed connecting the top and the bottom panels V, VI.

Moreover, the restraining members 40 shown in the said second embodiment to the fourth embodiment, having the facing end parts 41 at the nearly central part thereof can be made more easily than the case of the restraining members of the first embodiment. The facing end parts 41 of the restraining members 40 are produced by superposing ends of two strips of woven fabrics against each other and then by pulling the free ends of the respective strips in their longitudinal direction. Therefore, this type of the restraining member can be mass produced industrially more easily than the other types of restraining members shown in the first embodiment, wherein the breaking part is made by forming the folded part and then by sewing the strips in the said folded parts together.

In the fifth embodiment shown in FIG. 7, one pair of the restraining members 50, made of the same material as those of the said first embodiment, are constructed between the left side panel II and the right side panel IV of the gas bag 10d along Y axis with the surface in the transverse direction nearly parallel to X axis. The length of said restraining member is formed to be shorter than the distance between the left side panel III and the right side panel IV. In case of the fifth embodiment, the differences from the first embodiment are as follows; namely, the superposed part 51 is formed at a nearly central part in the longitudinal direction of the restraining members 50, and this superposed part 51 is designed to be broken when a tensile force larger than the predetermined value is applied to the restraining member 50 in it longitudinal direction. The other structures such as the connected condition of both end parts 54 of the restraining member and the respective left and right side panels III, IV are similar to those of the first embodiment.

Now, the superposed part 51, as the breaking part of the restraining member 50 of the fifth embodiment, is formed as follows. As shown in FIG. 7, the mutually opposing surfaces of the restraining member 50 are superposed at the nearly central part in the longitudinal direction thereof and the surfaces superposed against each other are sewn together in one body with the sewing thread 32 to form the plural rows of stitches 33 in parallel relative to the transverse direction. The tensile force of the sewing thread 32 employed for the superposed part 51 is smaller than that of the sewing thread 22 connecting the both end parts 54 of the restraining member with the panels as in the case of the first embodiment.

Also, the superposed part 51 is designed so that the sewing threads 32 are cut in order from those forming the row of stitches remote from the central part of the restraining member to those forming the row of stitches near the central part thereof in the longitudinal direction. When the force applied to the restraining member 50 is increased beyond the predetermined tensile value, the superposed part 51 is stretched to become a plane part (in case of the present invention, this kind of a change of form of the superposed parts of the restraining member is again included in the term "breaking"). Therefore, the effect of the smooth and gradual absorption of energy as in the case of the first embodiment is achieved.

The first embodiment through the fifth embodiment of the present invention were explained by examples in which the present invention was applied to a nearly cubic shape gas bag. Now, examples in which the present invention is applied by cylinder shaped gas bags will be explained in the sixth embodiment shown in FIG. 8 and the seventh embodiment shown in FIG. 9.

The respective sealed wall surfaces of the gas bag in the free inflated condition will be called as follows, for the convenience of the explanation. X, Y and Z axes passing through the nearly central portion of the hollow inner part are the same as the respective axes of the embodiments described before and therefore, further explanation about the said axes will be omitted:

front panel I$a$:
  the circular wall surface nearly perpendicular to the direction of X axis, (the front wall surface relative to the moving direction of the vehicle);

back panel II$a$:
  the circular wall surface opposite the front panel I$a$ in the nearly parallel relation thereto (namely, the surface directly touching the bodies of the passengers).

The hollow cylinder shaped gas bag consists of the front panel, the back panel and the annular side panel VII of which connects the said front and back panels. The material of said panels is the same as that of the cubic shape gas bag of the embodiments described above. The connected condition between the respective panels and the provided condition of the high pressure gas introducing hole are similar to those of the before described embodiments, so the detailed explanation thereof will be omitted. The feature of the present invention, namely the manner in which the restraining member is constructed in the hollow inner part of the gas bag and its operating effect will be mainly explained hereafter.

The gas bag 10$e$ of the sixth embodiment shown in FIG. 8 is constructed as follows; namely, one pair of the strip shape restraining members 60 made of the woven fabrics of nylon filament as in the first embodiment are constructed in the plane including Y axis and Z axis, connecting the mutually opposing wall surfaces along the bisector of Y axis and Z axis, in the condition that the length of the restraining members is shorter than the distance between the said mutually opposing wall surfaces in the free inflated condition. The facing part 61 is formed at the nearly central portion in the longitudinal direction of each restraining member 60, and this facing part 61 is designed and produced so that the said part 61 is broken as the breaking part when a tensile force larger then the predetermined value is applied to the restraining member 60 in its longitudinal direction. The plane part 64 of the both ends of the restraining member 60 in its longitudinal direction is connected with the mutually opposing wall surfaces along the bisector of the said Y axis and the Z axis by sewing them together in one body not through the bent end part as in the case of the first embodiment described above, but directly to form the stitches with the sewing thread 22 in parallel with the transverse direction of the restraining member 60.

The facing part 61 is formed as follows. Namely, the mutually opposing plane parts 61′ are made to face each other at nearly a central portion in the longitudinal direction of the strip type restraining member 60, this facing part is sewed together with the sewing thread 32 to form plural stitches 33 toward the transverse direction thereof. The tensile strength of the sewing thread 32 employed for the facing part 61 is smaller than that of the sewing thread 22 connecting both side end plane parts 64 of the restraining member 60 with the panels. Also, the facing part 61 is designed and sewn together so that the sewing thread 32 is cut at one time in the plane parts 61′ forming the facing part 61, and a stretching force larger than the predetermined value is applied to the restraining member 60.

Thus in the case of the sixth embodiment, when the tensile force applied to the restraining member 60 is increased and it reaches to the predetermined value, the facing part 61 formed in the restraining member 60 is stretched to be separated (again, in the case of the present invention, this kind of change of the facing part of the restraining member is also called a breaking). When this facing part is broken, the sewing thread 32 is cut at one time in the plane parts 61′ forming the facing part 61, and therefore, energy can be smoothly and effectively absorbed.

With respect to the seventh embodiment shown in FIG. 9, unlike the cases of the first embodiment to the sixth embodiment, the restraining member 70 is not made of the strip of woven fabrics, but a line shape member of nylon threads. The aspect different from said sixth embodiment is as follows. Namely, the plural line shape restraining members 70 are constructed in the plane including Y axis and Z axis, on Y axis line, Z axis line, and along the bisector of the said respective axes between the mutually opposing wall surfaces in the condition that the members are made to be shorter than the distance between the mutually opposing wall surfaces. The line shape restraining members are directly connected with the opposing wall surfaces in one body not with the sewing thread but with suitable adhesive material. The other structure is equal to that of the sixth embodiment. The tensile strength of the said line shape restraining members 70 is smaller then the strength of the binding force connecting the restraining members 70 with the opposing wall surfaces, and the restraining members 70 are designed and connected so that they are broken in order at their nearly central portion in the longitudinal direction, when a tensile force larger than the predetermined value is applied to the said member 70.

So, in case of the seventh embodiment, if the tensile force applied to the line shape restraining members 70 is increased to the predetermined value, the restraining members 70 are stretched in the longitudinal direction and split at the nearly central portion (again, in the case of the present invention, this kind of change of the line shape restraining member is also called breaking). When the said restraining members 70 are broken, as in the case of the sixth embodiment, the plural line shape restraining members 70 are cut in order at the nearly central portion of the longitudinal direction, and therefore, energy can be smoothly and gradually absorbed as in the case of the sixth embodiment.

In the embodiments 1 to 7, the present invention was explained in accordance with the gas bag of which restraining members were constructed within the hollow gas bag body so that said members are connected with the opposed inner wall surfaces to each other.

Also, the restraining members may be constructed on the outer surfaces of the gas bag as shown in the following embodiments.

In the case of the eighth embodiment of the present invention, as shown in FIG. 10A, an endless belt type restraining member 80 of substantially no elasticity is constructed surrounding the outer wall surface of the hollow cubic shape bag body in the plane including Y axis and Z axis of the gas bag 10g, namely, on the outer wall surfaces of four panels III to VI exclusive of the front panel I and the back panel II. the restraining member 80 is formed of the same material as those being employed for the said gas bag 10, of the first embodiment.

The total length of the restraining members is made to be shorter than that of the external circumference of the hollow bag body in free inflated condition in the plane including Y axes and Z axes. Plural strips of woven fabrics 86 are bent at their ends to form bent end parts, and the said parts are faced and sewed to one another to form one ring type member. It is constructed so that the surface in its transverse direction is made to be nearly parallel to the X axis. The facing parts 81 formed by abutting said bent end parts, operate as the breaking parts which are broken when a tensile force larger than the predetermined value is applied in the longitudinal direction of the restraining member 80. Plural strips 86 forming restraining member 80 are respectively sewed together in one body with the respective outer wall surfaces of both the left and right side panels III, IV and the top and bottom panels V, Vi with nylon thread 82 to form plural rows of stitches parallel to one another in the longitudinal direction of the strips 86. The row of stitches 83 exposed in the outer wall surfaces of the pieces 86 are subjected to a filler treatment with the coating material 15, so that the inner part of the hollow bag body of the bas bag 10g is made air tight.

Now, the facing parts 81 (the parts to be broken at the operation time) formed in the said restraining member 80 will be explained in detail in accordance with FIG. 10A and FIG. 10B. The bent end parts are made by bending both ends of the plural strips of woven fabrics 86 forming the said restraining member 80 in the perpendicular direction to the longitudinal direction of the said strips. The said bent end parts of respective strips 86 are as shown in the Figures, sewed together in one body with the sewing threads 84 to form plural rows of stitches 85 parallel to one another relative to the transverse direction (the direction of X axis) from the bottom part 81b to the top part 81a of the facing parts. The tensile strength of the sewing threads 84 employed for the facing parts 81 is made to be smaller than that of the sewing threads 82 which are used to sew the strips of the restraining member 80 together with both the left and right side panels III, IV and the top and bottom panels V, VI at the central part of the strips in the longitudinal direction. Also, the said abutting end parts 81 are designed and sewed together so that the row of stitches are cut in order from the forming the row of stitches near the bottom part 81b toward the forming the row of stitches near the top part 81a when a tensile force larger than the predetermined value is applied to the restraining member 80. Therefore, energy absorbing can be carried out smoothly and gradually.

In the eighth embodiment, the present invention is explained relative to a gas bag of which restraining members are provided with five facing parts 81. It is also possible to make the energy absorbing operation still more gradually by forming one or more than six facing or abutting end parts in the longitudinal direction of the restraining member and controlling the breaking time of each part.

The said eighth embodiment was explained relative to a cubic type gas bag. Now, the ninth embodiment will be described wherein a cylinder shape gas bag is shown, as in FIG. 11. The cylinder shape gas bag 10h is made in the same manner as the sixth embodiment. The restraining member 90 is constructed on the outer wall surface at the nearly central portion of the side panel VII in the longitudinal direction on the plane including Y axis and Z axis. The restraining member 90 of the ninth embodiment is formed to be of the endless belt type having plural breaking parts 91 along its longitudinal direction by sewing bent end parts of the strips 96 of woven fabrics with threads 92 in rows 95 the same as that of the eighth embodiment. The restraining member 90 and the side panel VII are sewed together in rows 93 with the sewing threads 92. The tensile strength of the respective sewing threads is different from each other. The total length of the restraining member is made to be shorter than that of the external circumference of the hollow bag body in free inflated condition in the plane including Y axis and Z axis.

When the tensile force applied to the endless belt type restraining member 90 is increased to the predetermined value, this restraining member 90 is stretched in its longitudinal direction and at the respective breaking parts 91 becomes split into separated condition.

When this restraining member 90 is broken, as in the case of the eighth embodiment, the sewing threads 92 of the breaking parts 91 provided at the plural portions of the restraining member in the longitudinal direction thereof are cut in order from that forming the row of stitches near the bottom part of the projected part toward that forming the row of stitches near the top part. Therefore, energy absorbing is carried out smoothly and gradually as in the case of the eighth embodiment.

With the said eighth and ninth embodiments, the explanation was made relative to examples in which only one restraining member is constructed in the hollow bag body on the plane including X axis and Y axis. Energy can be absorbed still more gradually by constructing plural restraining members at the mutually symmetrical positions with respect to the plane including the said Y axis and Z axis, and by controlling the breaking time of the breaking part of the respective restraint members.

Also, in case of the said eithth and ninth embodiments, the explanation was made concerning examples wherein the restraining member is continuously constructed on the outer peripheral wall surface of the hollow bag body. Besides the said case, such restraining member may be continuously constructed along inner peripheral wall surfaces of the hollow bag body in the plane including Y axis and Z axis.

In summary, the present invention relates to a gas bag employed for a gas bag system which is attached to a high speed moving apparatus such as an automobile and the like in the folded condition and into which high pressure gas is introduced by means upon detecting a sudden stop, to protect the passengers. It is characterized in that a hollow bag body is formed of sheet material of substantially no air permeability and elasticity provided with a gas-introducing hole for connection with a high pressure gas-supplying source. Restraining members are constructed in the said hollow bag body in the inflated condition due to the pressing of the occupant such that at least one breaking part is broken when the tensile strength of said restraining member is smaller than the predetermined value of the force applied to the said restraining members, whereby when said occupant presses said inflated gas bag body in sudden stop of said moving apparatus, said at least one braking part is broken and a rebounding force of said bag body against said occupant is reduced remarkably. The preceding embodiments have been explained relative to the operating processes of the gas bag device in the case of an automobile, as an example, the sudden stop thereof.

In the present invention, the sudden stop applies not only in the case of the collision of the moving apparatus sudh as the automobile, but in which the bodies of occupants are in danger of being thrown against the structural parts and bodily harmed.

According to the present invention, the value of the tensile strength of the breaking part of the restraining members can be controlled at will, by selecting suitably the form, length, width, and number of the restraining members, the sewing method such as the sort of row of stitches, number, width, pitch of the stich, and the sort of sewing thread.

Although certain specific embodiments of the invention have been shown and described, it is obvious that many modifications thereof are possible without departing from the spirit and scope of the invention. The invention, therefore, is not intended to be restricted to the exact showing of the drawings and description thereof, but is considered to include reasonable and obvious equivalents.

While the present invention has been explained in connection with a cubic shape gas bag and a cylinder shape in the preceding embodiments, it is equally applicable to an arbitrary shape gas bag, such as an elliptical and/or spherical one.

The material of the restraining members is not limited to the nylon filament material. Besides, macro molecular film, such as polyethylene and inorganic fiber such as glass fiber can be employed. The restraining members can be made of knit fabric.

As the breaking part of the said restraining members, in addition to the folded part, the facing part and the like, some part weaker then the other is provided at a portion of the fabrics itself of the restraining members in their longitudinal direction.

Moreover, in the respective embodiments, the restraining members and the respective panels are each breaking part restraining members and is connected to form rows of stitches with the sewing thread, but besides, the connection can be performed by means of adhesive, fasteners, snaps and the like. The gas-introducing hole is provided in a wall surface of the bottom panel in the preceding embodiments. It is equally possible to provide it in other wall surface of the bag body in accordance with the shape and the installing position of the bag body, etc.

The gas bag of the present invention can be also applied to the gas bag device for absorbing the shock in the sudden stop at the time of the collision and the like of the high speed moving apparatus such as the automobile and the like in its side body, and in this case, the gas bag is attached to that the X axis of the gas bag is coincident to the direction perpendicular to the moving direction of the moving apparatus, and that restraining members of the gas bag is made to be nearly parallel to the moving direction of said apparatus, and the gas bag is attached to the door panel, the side board, and the like, in the said moving apparatus.

We claim as our invention:

1. A gas bag employed for a gas bag device which is attached to a high speed moving apparatus such as an automobile and the like in the folded condition, and into which high pressure gas is introduced to be packed in order to protect occupants of said high speed moving apparatus by detecting the sudden stop of said moving apparatus, said gas bag comprising a hollow bag body formed of sheet material having substantially no air permeability and elasticity, a gas introducing hole means provided at a portion of said hollow bag body connecting with a high pressure gas supplying source and at least one relatively thin, narrow restraining member provided in said hollow bag body for restraining a free deformation of said hollow bag body inn the inflated condition, due to the pressing of the occupant, breakable means forming a part of said restraining member, said last named means breaking when the tensile force applied to said restraining member becomes larger than a predetermined value due to the pressing of the occupant, which value is less than the value required to rupture the body, whereby when said occupant presses said inflated bag body in the sudden stop of said moving apparatus, said breakable means is broken permitting further deformation of the bag body and the rebounding force of said bag body against said occupant is remarkably reduced.

2. A gas bag according to claim 1, wherein said hollow bag body is formed into a cubic shape.

3. A gas bag according to claim 1, wherein said hollow bag body is formed into a cylindrical shape.

4. A gas bag according to claim 1, wherein said hollow bag body is formed into an elliptical shape.

5. A gas bag according to claim 1, wherein said hollow bag body is formed into a spherical shape.

6. A gas bag according to claim 1, wherein said restraining member is provided within said hollow bag body in such a manner that both end portions of said restraining member are respectively fixed to a wall surface of said hollow bag body and another wall surface opposing thereto, the length of said restraining member being formed to be shorter than the distance between said wall surfaces opposing against each other in the free inflated condition of said hollow bag body.

7. A gas body according to claim 1, wherein said restraining member is equipped around the surface of said hollow bag body in such a manner that said restraining member is shaped as a ring-like band along a wall surfce of said hollow bag body.

the total length of said restraining member along said hollow bag body being formed to be shorter than the length of external circumference of said hollow bag body in free inflated condition.

8. A gas bag according to claim 6, wherein said restraining member is made of filament woven fabrics which is designed to have a predetermined value in the tensile strength.

9. A gas bag according to claim 6, wherein said restraining member is formed of a line shape member which is designed to have a predetermined value in the tensile strength.

10. A gas bag according to claim 6, wherein said restraining member is made of a macro molecular film which is designed to have a predetermined value in the tensile strength.

11. A gas bag according to claim 6, wherein said restraining member is made of an inorganic fiber which is designed to have a predetermined value in the tensile strength.

12. A gas bag according to claim 7, wherein said restraining member is made of filament woven fabrics which is designed to have a predetermined value in the tensile strength.

13. A gas bag according to claim 7, wherein said restraining member is formed of a line shape member which is designed to have a predetermined value in the tensile strength.

14. A gas bag according to claim 7, wherein said restraining member is made of a macro molecular film which is designed to have a predetermined value in the tensile strength.

15. A gas bag according to claim 7, wherein said restraining member is made of an inorganic fiber which is designed to have a predetermined value in the tensile strength.

16. A bas bag according to claim 8, wherein said hollow bag nody is formed into a cubic shape and said breaking part is formed by folding a nearly central part of said restraining member in its longitudinal direction, and sewing the adjacent parts of folded part together with thread to form the plural rows of stitches in the transverse direction thereof.

17. A gas bag according to claim 8, wherein said hollow bag body is formed into a cubic shape, and said breaking part is formed by facing two separated bent end portions of a nearly central part of said restraining member in its longitudinal direction and sewing together the adjacent facing parts with thread to form the plural rows of stitches in the transverse direction thereof.

18. a gas bag according to claim 8, wherein said hollow bag body is formed into a cubic shape, and said breaking part is formed by superposing each central portion of one pair of restraining members in the longitudinal direction and sewing together the adjacent superposed parts with thread to form the plural rows of stitches in the transverse direction thereof.

19. A gas bag according to claim 8, wherein said hollow bag body is formed into a cylindrical shape, and said breaking part is formed by facing each separated end portion of a nearly central portion of said two restraining members in the longitudinal direction and sewing together the adjacent facing parts with thread to form the plurl rows of stitches in the longitudinal direction thereof.

20. A gas bag according to claim 16, wherein said hollow bag body is made of nylon filament woven fabrics and one pair of the strip type restraining members are provided by sewing each end portion of said restraining members and mutually opposed wall surfaces of said hollow bag body together in such a manner that the transverse direction of said restraining member coincides with the pressing direction of said occupant to said hollow bag body.

21. A gas bag according to claim 17, wherein said hollow bag body is made of nylon filament woven fabrics and one pair of the strip type restraining members are provided by sewing end portions of said restraining members and the opposed wall surfaces of said hollow bag body together in such a manner that the transverse direction of said restraining member coincides with the pressing direction of said occupant to said hollow bag body.

22. A gas bag according to claim 17, wherein said hollow bag body is made of nylon filament woven fabrics and one pair of the strip type restraining members are provided by sewing end portions of said restraining members and the opposed wall surfaces of said hollow bag body together in such a manner that the thickness direction of said restraining members coincides with the pressing direction of said occupant to said hollow bag body.

23. A gas body according to claim 17, wherein said hollow bag body is made of nylon filament woven fabrics and one pair of the strip type restraining members are provided by sewing end portions of said restraining members and the top and bottom surfaces of said hollow bag body together in such a manner that the transverse direction of said restraining member coincides with the pressing direction of said occupant to said hollow bag body.

24. A gas bag according to claim 18, wherein said hollow bag body is made of nylon filament woven fabrics, and one pair of the strip type restraining members are provided by sewing end portions of said restraining members and the opposed wall surfaces of said hollow bag body together in such a manner that the transverse direction of said restraining members coincides with the pressing direction of said occupannt to said hollow bag body.

25. A gas bag according to claim 19, wherein said hollow bag body is made of nylon filament woven fabrics, and one pair of the strip type restraining members ar provided at right angles by sewing each end portion of said restraining members and the opposed wall surfaces of said hollow bag body together in such a manner that the thickness direction of said restraining members coincides with the pressing direction of said occupant to said hollow bag body.

26. A gas bag according to claim 9, wherein said hollow bag body is made of nylon filament woven fabrics, and four pair of said line shape members are radially provided by adhering each end portion of said restraining members to the mutually opposed wall surfaces of said hollow bag body in such a manner that the plane of said line shape members is vertical to the pressing direction of said occupant to said hollow bag body.

27. A gas bag according to claim 12, wherein said hollow bag body is formed into a cubic shape, and said breaking parts of said restraining members are formed by facing each end part of said restraining members in their longitudinal direction and sewing together the adjacent folded parts with thread to form the plural rows of stitches in the transverse direction thereof.

28. A gas bag according to claim 12, wherein said hollow bag body is formed into a cylindrical shape, and said breaking parts of said restraining members are formed by folding each end parts of said restraining members in their longitudinal direction and sewing together the adjacent folded parts with thread to form the plural rows of stitches in the transverse direction thereof.

29. A gas bag according to claim 27, wherein said hollow bag body is made of nylon filament woven fabrics and strip type restraining means are provided around said hollow bag body by sewing each end portion of said restraining member in such a manner that the transverse direction of said restraining members is parallel to the pressing direction of said occupant to said hollow bag body.

30. A gas bag according to claim 28, wherein said hollow bag body is made of nylon filament woven fabrics, and bag body by sewing each end portion of said restraining members together in such a manner that the transverse direction of said restraining members is parallel to the pressure direction of said occupant to said hollow bag body.

* * * * *